United States Patent Office 3,227,787
Patented Jan. 4, 1966

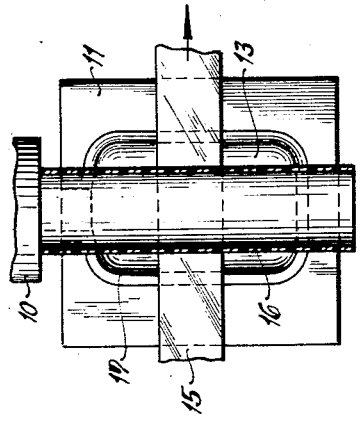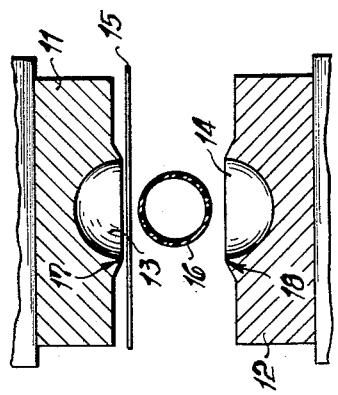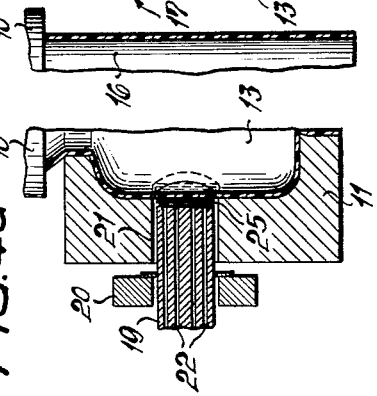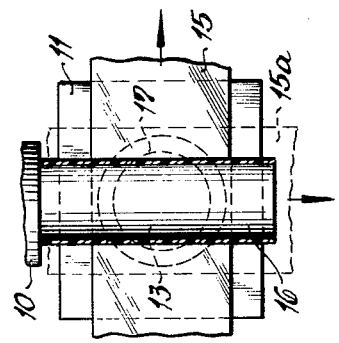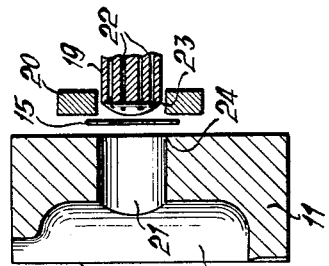

3,227,787
METHOD OF APPLYING MEMBERS, AS LABELS, PLATENS, OR THE LIKE TO HOLLOW BODIES IN A BLOWING PROCESS
Werner Battenfeld, Meinerzhagen, Westphalia, Germany, assignor to Firma Gebrüder Battenfeld, Meinerzhagen, Westphalia, Germany, a corporation of Germany
Filed June 16, 1964, Ser. No. 377,175
Claims priority, application Germany, Apr. 12, 1960, B 57,457
2 Claims. (Cl. 264—98)

This is a continuation-in-part application of the copending patent application Serial No. 102,581, filed April 12, 1961.

The present invention relates to a method of applying members, as labels, platens, or the like to hollow bodies in a blowing process.

It is known to print on hollow bodies, blown from hoses or bands, after the blowing process. This printing is time-consuming, particularly on bulky parts and especially in case of a multi-color print due to the partly required pretreatment of the blown hollow bodies, in order to adhere the color properly. Above all, for each configuration of the hollow bodies particular printing machines must be used.

It has been also proposed before to manufacture resinous plastic molded articles by inserting sheet material carrying transferable ink recordations thereon as successive portions of a continuous web between split dies which form when closed a cavity with the ink recordations spread out in a predetermined alignment with respect to a wall of the cavity, then forcing under pressure flowing resinous plastic material in a heated state into the cavity and against the ink recordations for fusing and baking the latter in an unmodified configuration to the resinous plastic molded article prior to and during solidification thereof, and detaching each of the molded articles with a portion of the sheet material adhering thereto from the web. Such process has been found proper in connection with split dies.

On the other hand, in the formation of containers from plastics, thermoplastic polymers formed by blow molding techniques are generally employed. In accordance to the teachings of the prior art, some support had to be provided in an attempt to provide markings directly on the surface of relatively flexible articles of this type. Additional marking problems have arisen due to the relatively complex curves of the surfaces of the molded plastics. Attemptsa hve been made to eliminate the marking problems by utilizing conventional printing techniques to first apply the desired marking on flat sheets, which are subsequently bonded on the surface of the plastics product. These attempts have, however, been relatively unsuccessful, since where the printed sheet is applied to the surface of the plastics article after formation thereof, the handling required raises production costs, particularly since such method cannot be performed in a single step.

Yet, attempts to bond the printed sheet to the product during the molding, which would permit a single step operation, have proven unsuccessful since the sheets became distorted during their application to the plastics product.

In order to overcome these drawbacks a method has been finally proposed, according to which the desired markings are formed on a flat, relatively flexible porous sheet material matrix, which is positioned in the mold in which the article is to be formed. Then the plastic parison is introduced in the mold and a vacuum is provided on the side of the matrix remote from the parison and molding the latter, whereby the surface of the expanding parison adjacent the matrix will have formed thereon the markings of the matrix free of any blemishes.

While this method amounted to an appreciable advance over the previous methods, the manufacture of the article is extremely slowed up because individual matrices are inserted into the open mold.

It is, therefore, one object of the present invention to provide a method of applying members, as labels, platens, or the like to hollow bodies in a blowing process, wherein the drawbacks of the known structures are avoided.

It is another object of the present invention to provide a method of successively and continuously applying members, as labels, platens, or the like to hollow bodies in a blowing process, wherein one- or multi-color printed, cold or preheated, thin walled leaves of the same or weldable or glueable material are inserted into hollow form halves or they are tensioned over the form halves, whereby a satisfactory connection between the members and the hollow bodies is brought about during the blowing process. It is possible, if desired, to use, instead of the pure leaves of plastic material, also paper which has a layer of weldable plastic material or glueable material corresponding with the material to be blown up, which paper may be printed with one color or with multiple colors on the side opposite that carrying the layer and which can be pressed also in relief and which is welded in the same manner, as described above. In this case likewise a satisfactory welding connection is achieved.

It is of advantage not to insert the leaf manually, and different possibilities are suitable for this purpose. There is one possibility to use a leaf, which is wider than the blown up body. In this case, in a manner conventional with the blowing of celluloid plates, during the closing of the form, a leaf corresponding in size to the form, is punched out by squeezing it off. The remaining margin can then be used for advancing a strip of the leaves to the next process step.

A further possibility exists in an arrangement according to which a printed leaf band is pulled over the form crosswise or lengthwise to the hose and is squeezed off in the same manner as set forth above. The further transportation of the leaf is brought about by gripping means which grips the cut-off end of the leaf and is pulled over the form halves corresponding with a printing guide. The guides of the sheet should be suitably movable with the corresponding form half, in order not to interfere with the feeding of the raw member to be blown up, namely the hose or the band. The insertion of the paper having a layer and which under circumstances is also printed, can take place in the same manner. It is, however, necessary to observe that the paper having a layer is properly connected during the blowing process with the blown up hose body, yet does not join the extension, which is possible in connection with leaves of thermoplastic material.

It is a further possibility to feed a paper of predetermined size having a layer by means of a particular feeding device into the hollow mold from the side of the clamping plate of the mold by a stamp which is equipped with vacuum nozzles for securing of the paper. The stamp forms then with the layer carrying paper one part of the mold.

The possibility exists thereby to use the feeding stamp, which is equipped with vacuum nozzles, simultaneously as a cutting stamp and to stamp out corresponding sections from a leaf band or a paper band having a layer of plastic material or glueable material and to feed these sections into the blowing mold. In this case uneven and curved faces can be inserted upon application of expandible leaves, while in the case of paper only the possibility of deforming of the paper by vacuum exists.

With these and other objects in view, which will become apparent in the following detailed description, the present invention will be clearly understood in connection with the accompanying drawings, in which:

FIGURE 1 is a hollow mold, for instance, for a ball shown in cross-section, the mold being shown in open position;

FIG. 2 is an axial section of a hose along a plane parallel to the division of the mold;

FIG. 3 is a second embodiment of the present device in a section similar to that shown in FIG. 2; and FIGS. 4a and 4b are axial sections of a blow mold and FIG. 4b in particular in open position and FIG. 4a in blowing or closing position.

Referring now to the drawings, and in particular to FIG. 1, a section of a hollow mold comprising two form halves 11 and 12 is shown, which section extends in a plane at a right angle to the axis of a hose 16 of plastic material. The still plastic hose 16 is fed horizontally or vertically directly or indirectly into the two form halves 11 and 12 from the nozzle 10 (FIG. 2), whereby the form halves 11 and 12 define the hollow spaces or cavities 13 and 14. A thin walled, cold or preheated or also full-plasticized leaf 15 covers the entire hollow space 13 of the form half 11, which assumes, in the example shown in FIGS. 1 and 2, a half wall. In this case, it is of no importance, whether the leaf 15 is fed parallel to or at a right angle to the hose 16 by rollers (not shown) or is inserted manually, for instance, by suspending the same on pins.

During the closing step, the leaf 15 is clamped between the hollow space 13 and the hose 16 by means of the plastic hose 16. During the blow up of the hose 16 by feeding of air thereto is known and conventional manner (not shown), for instance by means of an air pin through the nozzle 10 or by means of a needle which punctures the hose 16 in radial direction, the leaf 15 is welded together with the hose 16 and is blown up. Squeezing edges 17 and 18 cut the over-extending leaf 15 as well as the material of the hose 16 which project over the squeezing edges 17 and 18 in known manner.

As shown in FIG. 2, a leaf 15 is arranged movable at a right angle to the hose 16, while a leaf 15a, shown in dotted lines, is movable parallel to the hose 16.

Referring now to FIG. 3 of the drawing, another embodiment of the present invention is disclosed, in which the form half 11 defines a hollow space 13 which is of bottle-like shape. Between the hose 16, which is pressed out from the nozzle 10, and the form half 11 is disposed a printed leaf 15, which is inserted in the manner described above. Instead of providing the leaf 15 of thermoplastic material, it is of course also possible to use a printed paper, which on its rear side is equipped with a layer of weldable plastic or glueable material. In this case it must be observed that during the closing step the paper strip engages as closely as possible the blown-up hollow body. This can be enhanced in such a manner that the hose 16 is blown up already during the closing process and engages nearly the entire inner surface of the mold.

FIGS. 4a and 4b disclose sections taken at a right angle to the division of the mold and the squeezing edge 17 of the form half 11 and parallel to the axis of the hose 16 which is squeezed out through the nozzle 10. The form half 11 is equipped with an opening 21, which has a cross-section exactly identical with that of a stamp 19, so that the edge 23 of the stamp 19 forms jointly with the edge 24 of the form half 11 a punching tool. Between the two cutting edges 23 and 24, the leaf or the layer carrying paper 15 is inserted. During the closing movement, the stamp 19, which is equipped with vacuum nozzles 22, is moved onto the hollow chamber 13. By this arrangement, a platen 25 (FIG. 4a) is stamped out from the leaf 15 and the layer carrying paper, respectively, by means of the cutting edges 20 and 21, which platen 25 assumes, due to the concavely curved end face of the stamp 19, the form of the inner face of the wall of the bottle-shaped like chamber 13 and is sucked up towards the stamp 19 by means of the vacuum nozzles 22.

Upon completion of the closing process, the stamp 19 forms one part of the mold wall. Depending upon the length of movement of the stamp 19, the platen of thermoplastic material or of a layer carrying paper can be disposed indented and merely complementary relative to the inner wall face of the chamber 13, as shown in FIG. 4a. Upon termination of the blowing step, the stamp 19 is returned to its original position, after the vacuum effect in the nozzles 22 has been removed. During this step, the cut-off strip of the leaf 15 is taken off by means of a stripping ring 20 from the stamp 19, so that the leaf or the layer carrying paper 15 can now be advanced into the next operative position.

The conveying device for the leaf 15 can be of a structure similar to that used in the sheet metal industry and in printing plants, respectively, and this conveying device is not subject matter of the present invention. It is also possible to insert already pre-stamped platens instead of cutting them during the insertion step and to insert the same into the hollow body in the manner described above.

While I have disclosed several embodiments of the present invention, it is to be understood that these embodiments are given by example only and not in a limiting sense, the scope of the present invention being determined by the objects and the claims.

I claim:
1. A method of applying labels to a blow molded plastic article during the molding of said article in a hollow mold containing at least two parts, said method comprising the step of
    extruding a plastic tube into a multi-part, non-linear mold in one direction,
    feeding a sheet of label material crosswise to the direction of extrusion adjacent said tube into said mold during the open position of the latter,
    closing said mold and simultaneously cutting by said closing step a portion of said tube and of said sheet of label material,
    blow molding said tube, whereby the label adheres to the outer face of the blown portion of said tube by the pressure exerted by the blow molding, and
    opening said mold and removing the blow-molded product from the mold, and extruding further said tube and
    simultaneously advancing said sheet of label material into said opened mold.
2. The method, as set forth in claim 1, wherein
    said step of simultaneously cutting a portion of said sheet of label material and a portion of said tube performed solely by said step of closing said mold.

References Cited by the Examiner
UNITED STATES PATENTS

| | | | |
|---|---|---|---|
| 2,632,202 | 3/1953 | Haines | 264—98 |
| 2,811,744 | 11/1957 | Baldanza | 18—5.3 |
| 3,072,969 | 1/1963 | DuBois | 18—5 |
| 3,114,596 | 12/1963 | Wechsler | 264—94 |
| 3,117,904 | 1/1964 | Black | 156—475 |
| 3,120,571 | 2/1964 | Wolfer | 264—94 |
| 3,139,368 | 6/1964 | Flood | 156—475 |

ROBERT F. WHITE, *Primary Examiner.*

ALEXANDER H. BRODMERKEL, *Examiner.*